US010344819B2

(12) United States Patent
Schmidt et al.

(10) Patent No.: US 10,344,819 B2
(45) Date of Patent: Jul. 9, 2019

(54) DAMPER FOR A VEHICLE HAVING A FLANGE FOR CONNECTING AN EXTERNAL MODULE TUBE

(71) Applicant: ThyssenKrupp Bilstein GmbH, Ennepetal (DE)

(72) Inventors: Klaus Schmidt, Odenthal (DE); Ole Götz, Braunschweig (DE); Freddy Woenarta, Braunschweig (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 15/821,416

(22) Filed: Nov. 22, 2017

(65) Prior Publication Data

US 2018/0094688 A1    Apr. 5, 2018

Related U.S. Application Data

(63) Continuation of application No. 14/649,745, filed as application No. PCT/EP2013/075240 on Dec. 2, 2013, now Pat. No. 9,850,976.

(30) Foreign Application Priority Data

Dec. 7, 2012    (DE) .................. 10 2012 111 936

(51) Int. Cl.
*F16F 9/32*    (2006.01)

(52) U.S. Cl.
CPC ............ *F16F 9/325* (2013.01); *F16F 9/3207* (2013.01); *F16F 2230/0005* (2013.01)

(58) Field of Classification Search
CPC ... F16F 9/325; F16F 9/3207; F16F 2230/0005
USPC ........................................... 188/322.2
See application file for complete search history.

(56) References Cited

U.S. PATENT DOCUMENTS

| 5,375,683 | A | 12/1994 | Huang et al. |
| 6,283,259 | B1 | 9/2001 | Nakadate |
| 6,419,057 | B1 | 7/2002 | Oliver et al. |
| 6,427,986 | B1 | 8/2002 | Sakai et al. |
| 7,017,719 | B2 | 3/2006 | Forster |
| 7,950,506 | B2 | 5/2011 | Nowaczyk |
| 8,613,348 | B2 | 12/2013 | Hamers et al. |
| 9,803,713 | B2 * | 10/2017 | Schmidt ................ F16F 9/3235 |
| 9,850,976 | B2 * | 12/2017 | Schmidt .................. F16F 9/325 |

(Continued)

FOREIGN PATENT DOCUMENTS

| CN | 1126673 A | 7/1996 |
| CN | 102788064 A | 11/2012 |

(Continued)

*Primary Examiner* — Thomas W Irvin
(74) *Attorney, Agent, or Firm* — The Webb Law Firm

(57) ABSTRACT

A shock absorber having a shock absorber tube (10) is disclosed and has an external module tube (11) which is connected to the shock absorber tube (10) via a flange (12), wherein the flange (12) has one or more fluid ducts (13, 14) which fluidly couple the module tube (11) to the shock absorber tube (10). The flange (12) has at least one metallic support cage (15) which forms a retentive connection between the shock absorber tube (10) and the module tube (11), and the flange (12) has a plastics body (16) in which the fluid duct (13, 14) for the fluidic coupling of the module tube (11) to the shock absorber tube (10) is formed.

11 Claims, 4 Drawing Sheets

(56) References Cited

U.S. PATENT DOCUMENTS

| | | | |
|---|---|---|---|
| 2006/0283677 A1* | 12/2006 | Schmidt ............... | F16F 9/325 188/322.19 |
| 2008/0265476 A1 | 10/2008 | Beck | |
| 2009/0032346 A1 | 2/2009 | Nowacyk | |
| 2014/0090941 A1 | 4/2014 | Shibahara | |
| 2015/0369324 A1 | 12/2015 | Schmidt et al. | |

FOREIGN PATENT DOCUMENTS

| | | | |
|---|---|---|---|
| DE | 4324443 A1 | 1/1995 | |
| DE | 19527849 C1 | 8/1996 | |
| DE | 19646827 C1 | 1/1998 | |
| DE | 102004034725 A1 | 3/2005 | |
| DE | 10355151 A1 * | 6/2005 | ............ F16F 9/325 |
| DE | 10355151 A1 | 6/2005 | |
| DE | 102005022941 A1 | 11/2006 | |
| DE | 112007002377 T5 | 8/2009 | |
| DE | 102008062162 B3 | 6/2010 | |
| DE | 112008001980 T5 | 7/2010 | |
| EP | 1508723 A2 | 2/2005 | |
| JP | 791478 A | 4/1995 | |
| WO | 2009081363 A1 | 7/2009 | |

* cited by examiner

DAMPER FOR A VEHICLE HAVING A FLANGE FOR CONNECTING AN EXTERNAL MODULE TUBE

CROSS-REFERENCE TO RELATED APPLICATIONS

This application is a continuation of U.S. application Ser. No. 14/649,745, filed Jun. 4, 2015, which was the United States national phase of International Application No. PCT/EP2013/075240 filed Dec. 2, 2013, and claims priority to German Patent Application No. 10 2012 111 936.8 filed Dec. 7, 2012, the disclosures of which are hereby incorporated in their entirety by reference.

BACKGROUND OF THE INVENTION

Field of the Invention

The present invention relates to a shock absorber having a shock absorber tube and having an external module tube which is arranged retentively on the outside of the shock absorber tube by way of a flange, wherein the flange has one or more fluid ducts which fluidically couple the module tube to the shock absorber tube.

Description of Related Art

DE 11 2007 002 377 T5 has disclosed, for example, a shock absorber with a shock absorber tube, and an external module tube is provided in which a further valve arrangement is accommodated. In this case, the module tube extends perpendicular to the shock absorber tube, and the flange for connecting the module tube to the shock absorber tube is formed by the module tube itself.

DE 11 2008 001 980 T5 has disclosed a shock absorber with a shock absorber tube and with an external module tube in which a valve body arrangement is accommodated. Between the shock absorber tube and the module tube there are situated transfer rings which form a flange between the two tubes and by means of which the module tube is attached retentively to the shock absorber tube. Fluid ducts are formed through the transfer rings in order to connect the valve body arrangement in the external module tube to the shock absorber tube. In this case, the maximum possible distance between the module tube and the shock absorber tube is structurally limited by the design of the transfer rings.

The connection between the module tube and the shock absorber tube must perform a mechanical retention function in addition to the fluidic connection function. This demands a high level of mechanical strength of the module tube on the shock absorber tube, and if the distance between the module tube and the shock absorber tube has to be increased, for example for structural reasons, it is no longer possible for the flange connection between the module tube and the shock absorber tube to be formed by transfer rings, as these can no longer withstand adequate mechanical load.

It is duly possible for a flange composed of a metallic material to be provided, which makes it possible to realize a high level of strength between the module tube and the shock absorber tube, in particular if the tubes are welded to the flange, but a flange composed for example of a metallic solid material may easily exhibit a high weight. In particular in situations where shock absorber tubes are used as unsprung masses on a vehicle, it is important to realize a low weight of the shock absorber. A flange composed of a plastics material would duly be lighter but would not exhibit the required strength, and the module tube would not be attached to the shock absorber tube with adequate mechanical strength.

If, for example, a flange composed of a metallic solid material is provided, there is also the problem of sealing off the fluid ducts with respect to the tube bodies. The fluid ducts must pass through the flange and be connected to openings formed in the shock absorber tube and in the module tube. If the connection between the flange and the tubes is formed by a welded connection, this makes it difficult to realize sealing between the fluid ducts in the flange and the outer sides of the tubes.

SUMMARY OF THE INVENTION

It is therefore the object of the present invention to provide a shock absorber having a shock absorber tube and having an external module tube, wherein the connection between the module tube and the shock absorber tube is formed by an improved flange which makes it possible to realize a mechanically loadable arrangement of the module tube on the shock absorber tube and which has a low weight. Furthermore, the task of connecting the fluid ducts to the shock absorber tube and to the module tube in pressure-tight fashion must be performed.

Said object is achieved, taking a shock absorber as per the preamble of claim 1 and a flange as per the preamble of claim 9 as a starting point, by means of the respective characterizing features. Advantageous refinements of the invention are specified in the dependent claims.

The invention encompasses the technical teaching that the flange has at least one metallic support cage which forms a retentive connection between the shock absorber tube and the module tube, and that the flange has at least one plastics body in which the at least one fluid duct for the fluidic coupling of the module tube to the shock absorber tube is formed.

Here, the invention is based on the concept of creating a flange between a shock absorber tube and an external module tube, which flange has a metallic support cage for the mechanically loadable connection of the two tubes, and fluid ducts which are formed in a plastics body are provided for the fluidic connection of the two tubes. It is thus not necessary for the plastics body to accommodate any mechanical retention forces in order to connect the module tube to the shock absorber tube, and the plastics body can form the fluid ducts in an advantageous manner, without the metallic support cage having to be optimized for forming the fluid ducts. The flange thus formed exhibits a low weight, and the metallic support cage can have dimensions greater than the dimensions of the fluid ducts in the plastics body. Owing to the enlarged dimensions of the metallic support cage, an improved load situation is realized, because the cross section of the mechanical connection between the module tube and the shock absorber tube can accommodate greater tilting moments. Within the metallic support body there may be formed one or more fluid ducts which extend for example perpendicularly between the module tube and the shock absorber tube.

Owing to the advantageous embodiment of the flange, the metallic support cage can be formed in a simple manner from a sheet-metal component produced by deformation processes. In the present case, a support cage is to be understood to mean a three-dimensional structure or a framework, and thus a type of cage, which is preferably produced from a sheet-metal body with a sheet-metal thickness, wherein every dimension of the cage in its three dimensions in space is greater than the sheet-metal thickness of the sheet-metal body. The support cage may in this case also be of multi-part form or assembled from multiple sheet-metal components.

The sheet-metal component may be provided as a punched product of flat form, which in one possible embodiment is subsequently bent into an approximately rectangular box shape and closed for example by way of two longitudinal edges, which are oriented toward one another and provided with a weld. It is also advantageously possible for a punched product which is initially of flat form to be made into the structure or framework without seams by way of punching and bending operations, which structure or framework is subsequently encapsulated with the material of the plastics body by way of a plastics injection molding process.

This realizes a first design variant of the flange, in which the metallic support cage at least partially or entirely surrounds the outside of the plastics body, and a second design variant of the flange is realized, in which the metallic support cage is at least partially or entirely enclosed in the plastics body and in particular is encapsulated by the material of the plastics body. The latter variant yields the advantage in particular that the metallic support cage cannot oxidize, as it is substantially completely surrounded by the plastics body. If the support cage substantially completely surrounds the plastics body, this yields the advantage of improved mechanical durability, because the flange between the two tubes generates a large geometrical moment of inertia owing to its external arrangement, and the support cage can be connected to the tubes in improved fashion, for example substance bonded.

It is likewise advantageous for the plastics body to be produced by way of a plastics injection molding process, or the plastics body is provided by a dimensionally stable body around which the metallic support cage is arranged. It is also conceivable for the plastics body to be injected, as an injection-molded component, into the metallic support cage, or the plastics body is produced by virtue of the support cage being encapsulated by the plastics material. In this case, corresponding provisions may be made for the fluid ducts to be formed into the injection-molded plastics body.

In a first possible embodiment, the fluid ducts may be formed by passages in the plastics body itself. The plastics body may be composed of a fiber-reinforced, strong plastic, for example fiber-reinforced polyamide, and here, even in the presence of fluctuating pressures of a fluid conducted through the passages, the pressure loading from the interior of the fluid ducts does not lead to damage to the plastics body. Sealing elements for sealing the passages may be arranged between the plastics body and the shock absorber tube and/or the module tube. The sealing elements may be formed for example by O-ring seals. This yields a very simple embodiment of the flange, in which the fluid ducts are formed by simple passages in the plastics body. In particular, the plastics body may be designed for receiving the sealing elements.

In a further advantageous embodiment, the fluid ducts may be formed by preferably metallic tube elements which are received in the plastics body. The tube elements may be formed for example as injection-molding inserts, which can be encapsulated with the material of the plastics body in the plastics injection molding process. Alternatively, the tube elements may be inserted into the plastics body after the formation of the latter. It is also possible for sealing elements to be arranged between the tube elements and the shock absorber tube and/or the module tube in order to seal the transition between the tube elements and the shock absorber tube and/or the module tube. If metallic tube elements are used, these can be designed to exhibit greater pressure resistance than passages in the plastics body, and metallic tube elements may be provided for forming the fluid ducts in the plastics body for example if a fluid is to be conducted at high pressures through the fluid ducts, or if, as is preferable, a soft material is selected for forming the plastics body.

In an alternative embodiment, it is also possible for the tube elements to be connected to the support cage, that is to say for example welded into the latter, before the injection molding of the plastics body.

In a further advantageous embodiment, the metallic support cage may be welded to the shock absorber tube and to the module tube. As an alternative to the welding of the support cage to the shock absorber tube and/or to the module tube, the metallic support cage may be brazed to the tubes. It is likewise possible for screw connections or other positively locking or non-positively locking connections to be provided, and owing to the large cross-sectional dimensions of the support cage, no locally high loads arise in the connection between the support cage and the shock absorber tube and/or the module tube.

In yet another embodiment, it is possible for at least a clamp, a sleeve or the like to be provided which jointly encloses the shock absorber tube and the module tube, and when the clamp or the flange is braced, the tubes can be pressed against the respective abutment sides, facing toward the tubes, of the flange. It is possible in this way, too, to form a mechanically loadable and fluid-tight arrangement of a flange between the shock absorber tube and the module tube, and a substance bonded connection, for example, between the flange and the tubes can be omitted.

The present invention is also directed to a flange for connecting a shock absorber tube to an external module tube of a shock absorber, wherein the flange has one or more fluid ducts by which the module tube can be fluidically coupled to the shock absorber tube, and at least one metallic support cage is provided which forms the retentive connection between the shock absorber tube and the module tube, and furthermore, a plastics body is provided in which the at least one fluid duct for the fluidic coupling of the module tube to the shock absorber tube is formed. The further features and associated advantages described above in conjunction with the shock absorber self-evidently apply equally to the flange according to the invention.

In particular, the fluid ducts may be formed by passages in the plastics body of the flange; alternatively, in the plastics body, there are arranged preferably metallic tube elements which form the fluid ducts. It is furthermore advantageously possible for the metallic support cage to be formed from a sheet-metal component produced by deformation processes, and/or it may be provided that the plastics body is produced by way of a plastics injection molding process.

It is provided in particular that, when the metallic support cage is connected substance bonded, in positively locking fashion or in non-positively locking fashion to the shock absorber tube and/or to the module tube, a connection of the passages in the plastics body or the tube elements to openings formed in the shock absorber tube and/or in the module tube is realized simultaneously. The openings form window-like passages into the interior of the shock absorber tube and/or of the module tube, and sealing elements may be fitted between the passages and/or the tube elements in the plastics body and the openings in the shock absorber tube and/or in the module tube. If, then, the support cage is connected to the shock absorber tube and to the module tube, a pressure-tight connection of the fluid ducts in the plastics body to the tubes can be realized simultaneously by way of the sealing elements. For example, a device may be used to press the shock absorber tube and the module tube against respective receiving sides on the flange, in order for the support cage to subsequently be welded to the tubes. This simultaneously gives rise to the pressure-tight connection of the fluid ducts in the plastics body to the shock absorber tube and to the module tube.

For example, it may be provided that the metallic support cage has an edge region for welding, or in an alternative embodiment, has connecting tongues, by means of which the support cage can be connected substance bonded, that is to say for example brazed or welded, to the shock absorber tube and to the module tube.

Further measures which improve the invention will be discussed in more detail below in conjunction with the description of a preferred exemplary embodiment of the invention and with reference to the figures. In the figures:

DESCRIPTION OF THE INVENTION

Figure 1:
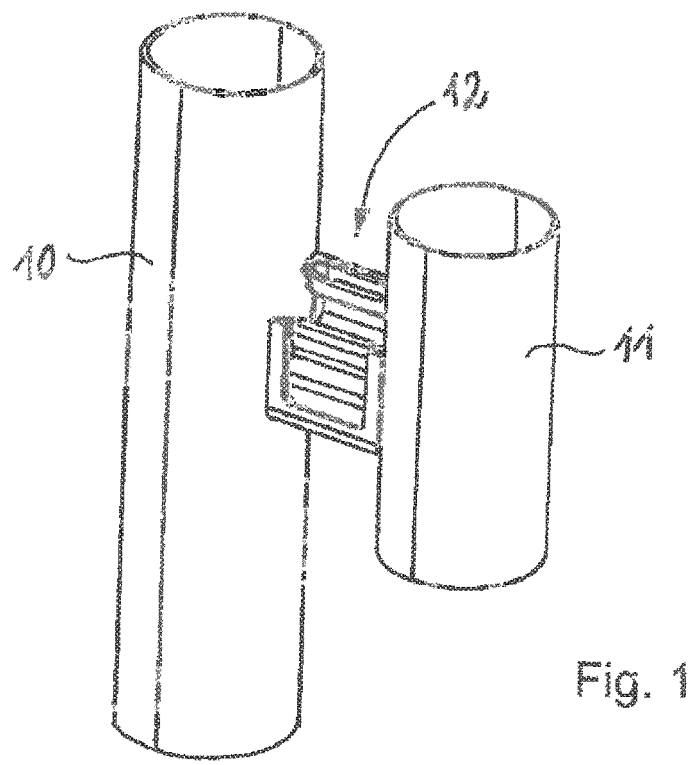
FIG. 1 shows a perspective view of a shock absorber with a shock absorber tube, a module tube and a flange which connects the tubes, as per a first possible embodiment.

FIG. 1 shows, as a first exemplary embodiment and in a perspective view, parts of a shock absorber having a shock absorber tube 10 and having an external module tube 11, and a flange 12 is arranged between the shock absorber tube 10 and the external module tube 11. The flange 12 connects the module tube 11 to the shock absorber tube 10, and the module tube 11 is held mechanically on the shock absorber tube 10 by way of the flange 12. The shock absorber tube 10 and the module tube 11 are shown merely schematically, and in the module tube 11 there may be accommodated, for example, a valve assembly which fluidically communicates with the shock absorber tube 10 via fluid ducts in the flange 12. Alternatively, in the module tube 11, there may be formed an additional absorber volume, which likewise requires fluid ducts in the flange 12 in order to fluidically communicate with the shock absorber tube 10. The exemplary embodiment of the flange 12 is illustrated in detail in the following FIG. 2.

Figure 2:
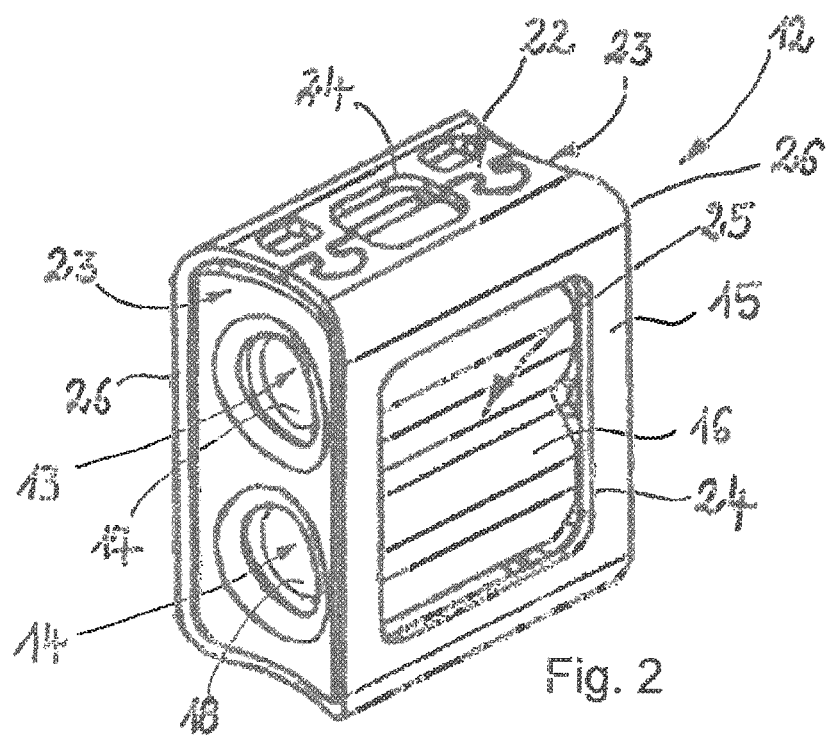
FIG. 2 shows a perspective view of the flange having the features of the present invention as per the first embodiment.

FIG. 2 shows an exemplary embodiment of a flange 12 for connecting a shock absorber tube 10 to an external module tube 11, as shown in FIG. 1. The flange 12 has a metallic support cage 15 in which a plastics body 16 is received. The metallic support cage 15 is formed from a sheet-metal component produced by deformation processes, and on the top side, the sheet-metal component of the support cage 15 has a connecting region 22. It is thus possible for the sheet-metal component to be provided initially from a flat punched strip, before subsequently being bent into the box shape that is shown. Finally, in the connecting region 22, a connection of the opposite ends of the sheet-metal component may be produced in order to realize a mechanically loadable support cage 15.

In the longitudinal direction, the flange 12 is delimited by abutment sides 23 which are inwardly arched, and the arching is adapted to the curvature of the outer side of the shock absorber tube 10 and of the module tube 11. It is thus possible for the abutment sides 23 to surround the outer circumference of the tubes 10 and 11 in the region of overlap, without a gap being formed between the flange 12 and the outer side of the shock absorber tube 10 and/or of the module tube 11. For the connection of the tubes 10, 11 to the abutment sides 23, the metallic support cage 15 has edge regions 26 which face toward the tubes 10, 11, and a substance bounded connection can be produced between the edge regions 26 and the outer surface of the tubes 10, 11. In this case, the edge regions 26 border the abutment sides 23 of the flange 12, such that, for example, an encircling weld in the edge region 23 can connect the tubes 10, 11.

In the plastics body 16 there are formed fluid ducts 13 and 14 which are formed by simple passages 17, 18 in the plastics body 16, such that the module tube 11 can fluidically communicate with the shock absorber tube 10 through the fluid ducts 13 and 14.

In the side regions of the metallic support cage 15 there are formed windows 24, by means of which a further reduction of the weight of the flange 12 is realized. Furthermore, the plastics body 16 has an outer contour 25 which is adapted to the passages 17 and 18 and which likewise serves to realize a further optimization of the overall weight of the flange 12.

Figure 3:
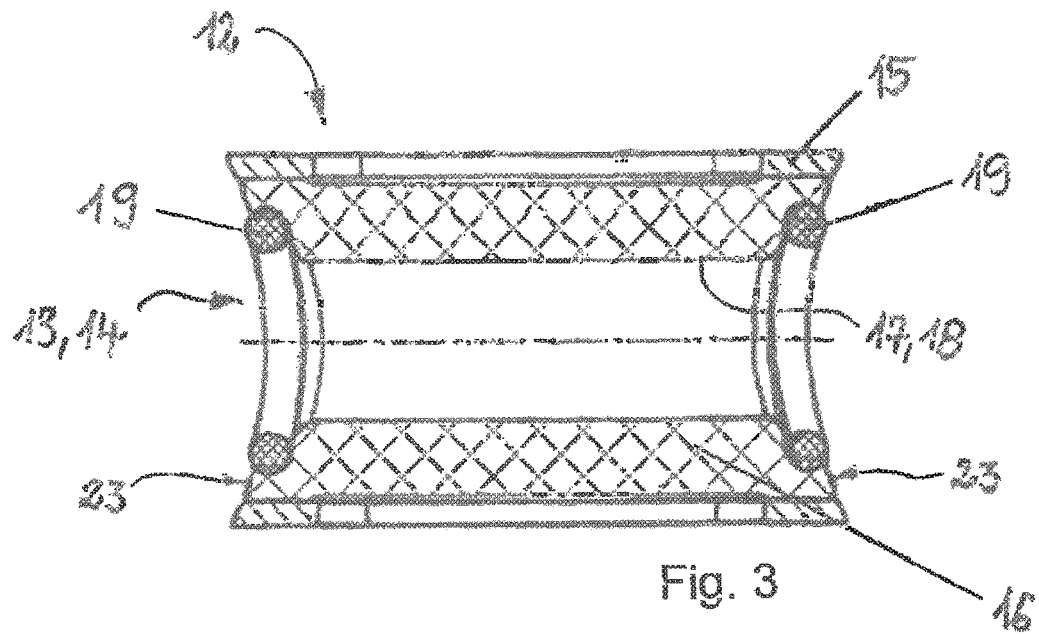
FIG. 3 shows a sectional view of the flange as per the first embodiment.

FIG. 3 shows a cross-sectional view of the exemplary embodiment of the flange 12 as per FIG. 2. The cross section runs along one of the fluid ducts 13, 14 which are formed by simple passages 17, 18 in the plastics body 16. The plastics body 16 is enclosed by the metallic support cage 15, which is likewise illustrated in cross section. In the region of the abutment sides 23, there are fitted sealing elements 19 in the form of O-ring seals for the purposes of sealing off the fluid ducts 13, 14. When the shock absorber tube 10 and the module tube 11 are arranged against the abutment sides 23 of the flange 12, the sealing elements 19 are compressed, such that a sealing action is generated between the plastics body 16 and the shock absorber tube 10 and the module tube 11, respectively.

Figure 4:
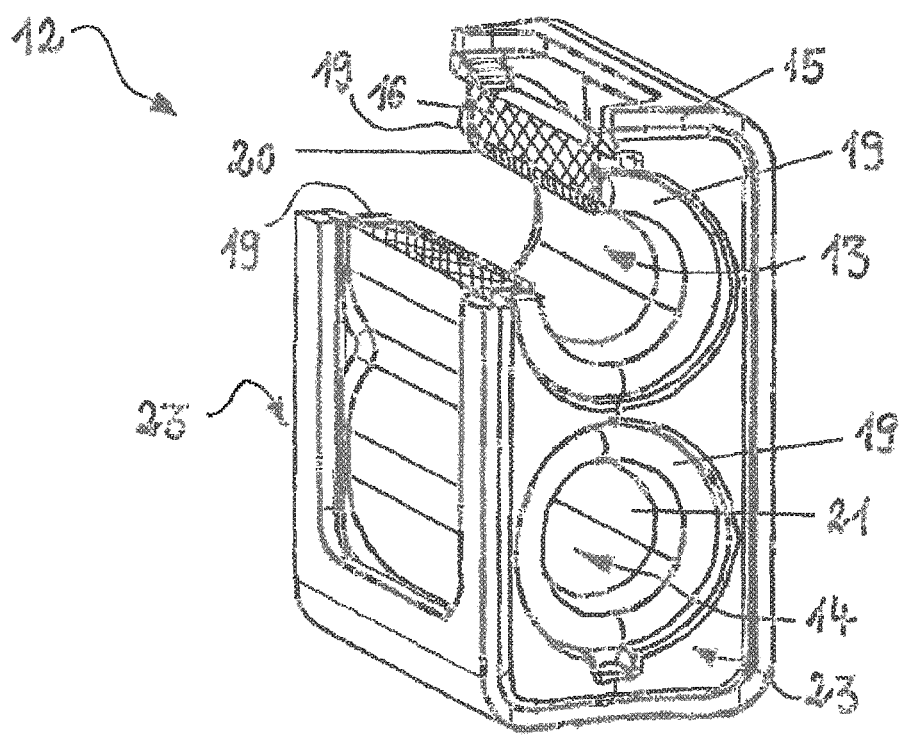
FIG. 4 shows a perspective view of a flange in a modified embodiment and in a partially sectional view.

In a modification of the first exemplary embodiment as per FIGS. 2 and 3, the further exemplary embodiment as per FIG. 4 shows a flange 12 with a metallic support cage 15 in which a plastics body 16 is accommodated, and the fluid ducts 13, 14 in the plastics body 16 are formed by tube elements 20, 21 which run approximately parallel to one another and which extend between the abutment sides 23. Sealing elements 19 are arranged on the ends of the tube elements 20, 21 in order that, when the shock absorber tube 10 and the module tube 11 are arranged against the abutment sides 23, a sealing action is generated between the tube elements 20 and 21 and the shock absorber tube 10 and the external module tube 11 respectively.

The plastics body 16 may be formed for example from a fiber-reinforced polyamide, if the fluid ducts 13 and 14 are formed by passages 17 and 18, which are formed directly in the plastics body 16. Furthermore, the plastics body 16 may be formed from an elastic, for example rubber-like, material, in particular if tube elements 20, 21 are used to form the fluid ducts 13, 14. In particular if tube elements 20, 21 are used, a fluidic pressure in the fluid ducts 13 and 14 does not act on the plastics body 16, such that the latter does not need to withstand high pressures.

Figure 5:
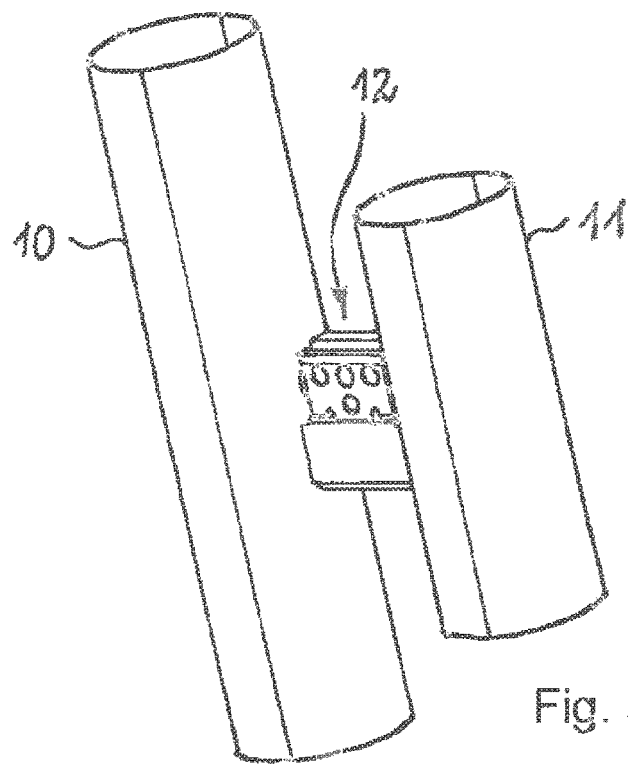
FIG. 5 shows a perspective view of a shock absorber with a shock absorber tube, a module tube and a flange which connects the tubes, as per a further possible embodiment.

FIG. 5 shows, in a perspective view, a further possible exemplary embodiment of a flange 12 between a shock absorber tube 10 and an external module tube 11. The flange 12 connects the module tube 11 to the shock absorber tube 10, and the module tube 11 is mechanically retained on the shock absorber tube 10 by way of the flange 12, wherein the construction of the flange 12 will be described in more detail below in conjunction with FIGS. 6 and 7.

Figure 6:
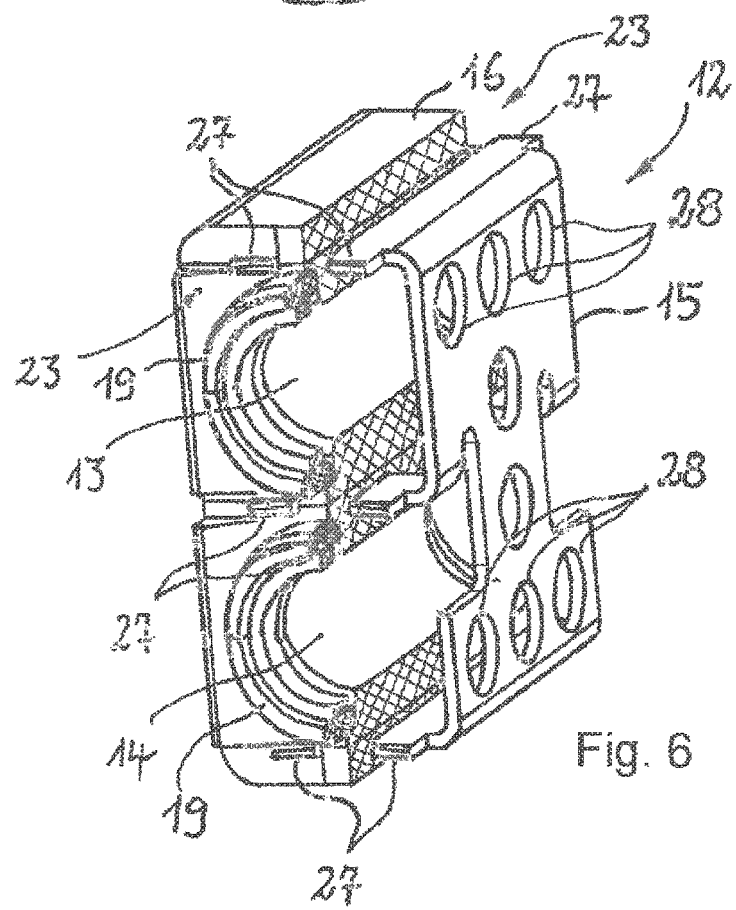
FIG. 6 shows a perspective view of the flange as per the further embodiment shown in FIG. 5, wherein the plastics body is illustrated in section.
Figure 7:
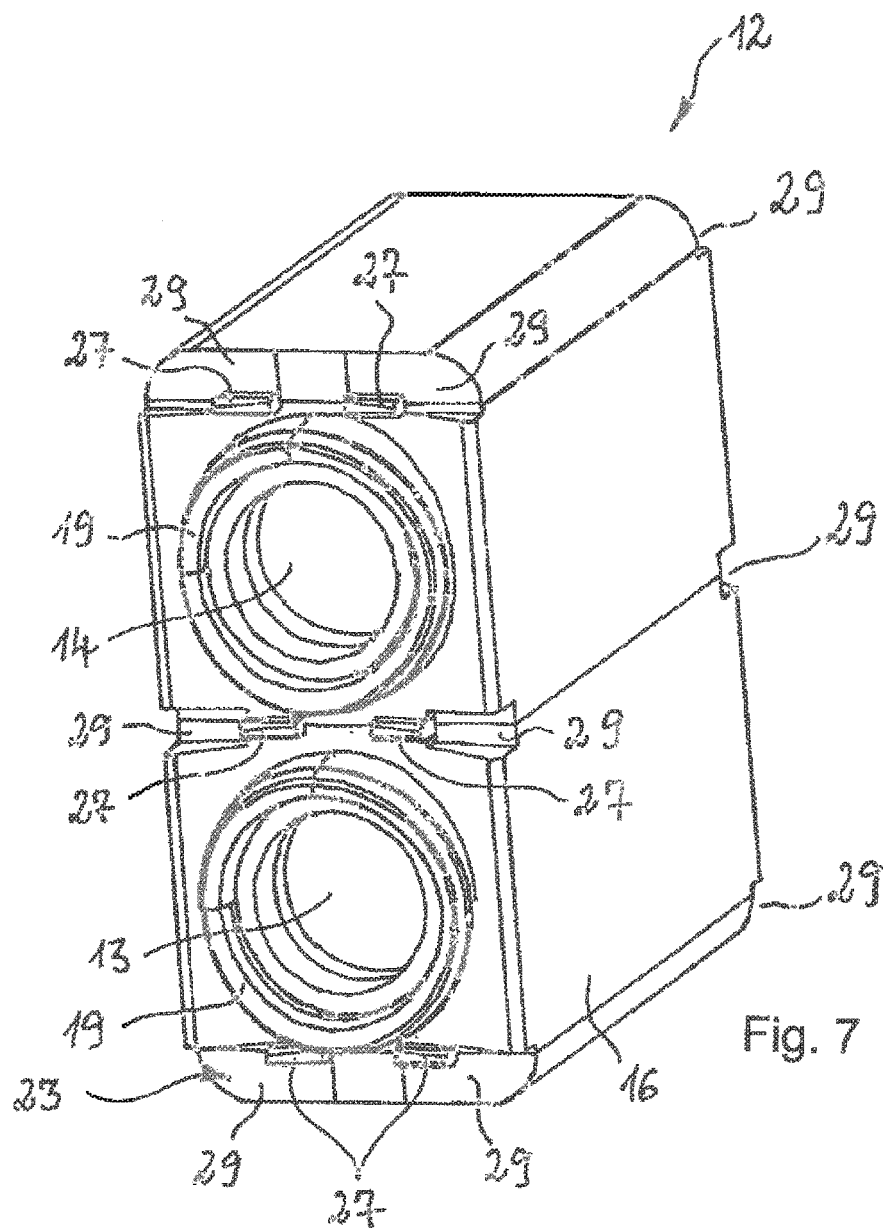
FIG. 7 shows the exemplary embodiment of the flange as per FIGS. 5 and 6 in a non-sectional view.

FIGS. 6 and 7 show the flange 12 for arrangement between a shock absorber tube 10 and a module tube 11 as per FIG. 5 in a partially sectional view (FIG. 6) and in a complete perspective external view (FIG. 7). Here, the partially sectional view as per FIG. 6 shows the support cage 15 in its entirety, and the plastics body 16 is illustrated in a half-section, such that an open half of the support cage 15 is freely visible.

In this exemplary embodiment, the support cage 15 forms an insert component in the plastics body 16, such that the plastics body 16 substantially completely surrounds the support cage 15. This variant of the flange 12 can be produced in an advantageous manner in particular by way of an injection molding process in which the metallic support cage 15 can form an insert component in the injection molding die, and the material of the plastics body 16 is injected around the support cage 15 in the injection molding process. For weight optimization, the support cage 15 has recesses 28 which are formed, for example, as circular holes and which permit a weight reduction, similarly to the windows 24 in the support cage 15 as per the first exemplary embodiment in FIG. 2.

On the abutment side 23 of the flange 12 for coupling to the tubes 10, 11, the support cage 15 has connecting tongues 27 which protrude out of the plastics body 16 even after the encapsulation of the support cage 15 in the plastics body 16. Here, the connecting tongues 27 serve for the substance bonded connection of the tubes 10, 11, and may for example be welded to the latter. The welding of the connecting tongues 27 to the tubes 10, 11 may be realized in this case by means of a welding tool which can be moved to the connecting tongues 27 via access openings 29 shown in FIG. 7. The welding tool may be formed for example by a laser beam or by a welding electrode. It is likewise advantageously possible for the welded connection between the connecting tongues 27 and the tubes 10, 11 to be realized by way of a resistance welding process.

The fluid ducts 13, 14 may be formed in the same way as has already been described in conjunction with FIG. 3 and in conjunction with FIG. 4. At the front side there are illustrated sealing elements 19 which are inserted into receiving depressions for receiving said sealing elements. Here, the receiving depressions are formed in the plastics body 16 and may comprise grooves into which lugs arranged on the sealing elements 19 can be seated in order to ensure radial orientation of the sealing elements 19. This may be necessary since the abutment sides 23 of the flange 12 are adapted to the curvature of the tube outer side of the tubes 10, 11, whereby the sealing elements 19 may exhibit a varying cord thickness and are thus likewise adapted to the curvature of the tube outer sides, whereby said sealing elements require radial orientation.

The invention is not restricted, with regard to its embodiment, to the preferred exemplary embodiments specified above. Rather, numerous variants are conceivable which make use of the presented solution even in fundamentally different embodiments. All of the features and/or advantages which emerge from the claims, the description or the drawings, including structural details or spatial arrangements, may be essential to the invention both individually and in a wide variety of combinations.

LIST OF REFERENCE NUMERALS

10 Shock absorber tube
11 External module tube
12 Flange
13 Fluid duct
14 Fluid duct
15 Metallic support cage
16 Plastics body
17 Passage
18 Passage
19 Sealing element
20 Tube element
21 Tube element
22 Connecting region
23 Abutment side
24 Window
25 Adapted external contour
26 Edge region
27 Connecting tongue
28 Recess
29 Access opening

The invention claimed is:

1. A shock absorber comprising:
a shock absorber tube;
an external module tube; and
a flange connecting the external module tube to the shock absorber tube, the flange further comprising:
a metallic support cage forming a retentive connection between the shock absorber tube and the module tube; a plastic body received in the metallic support cage; and
one or more fluid ducts formed in the plastic body which fluidly couple the module tube to the shock absorber tube, and
wherein the metallic support cage is arranged on an outside of and in contact engagement with the plastic body to form the sides of the plastic body.

2. The shock absorber as claimed in claim 1, wherein the metallic support cage is formed from a sheet-metal component produced by deformation processes, or wherein the plastic body is produced by way of a plastics injection molding process.

3. The shock absorber as claimed in claim 1, wherein the one or more fluid ducts is formed by passages in the plastic body.

4. The shock absorber as claimed in claim 3, wherein sealing elements for sealing the passages are arranged between the plastic body and the shock absorber tube and/or the module tube.

5. The shock absorber according to claim 1, wherein the one or more fluid ducts are formed by metallic tube elements which are received in the plastic body.

6. The shock absorber as claimed in claim 5, wherein sealing elements for sealing between the metallic tube elements and the shock absorber tube or the module tube are arranged between the metallic tube elements and the shock absorber tube or the module tube.

7. The shock absorber as claimed in claim 1, wherein the metallic support cage is substance bonded to the shock absorber tube and to the module tube.

8. The shock absorber as claimed in claim 1, wherein the flange is delimited by inwardly-arched abutment sides shaped to the curvature of the shock absorber tube and the module tube.

9. The shock absorber as claimed in claim 8, wherein the metallic support cage has edge regions engaged with the shock absorber tube and the module tube.

10. The shock absorber as claimed in claim 9, wherein the edge regions of the metallic support cage are substance bonded to the shock absorber tube and to the module tube.

11. The shock absorber as claimed in claim 10, wherein the edge regions of the metallic support cage are welded to the shock absorber tube and to the module tube.

* * * * *